Feb. 4, 1930.  R. L. MILTON  1,745,552
VEHICLE BRAKE MECHANISM
Filed Oct. 27, 1926  4 Sheets-Sheet 1
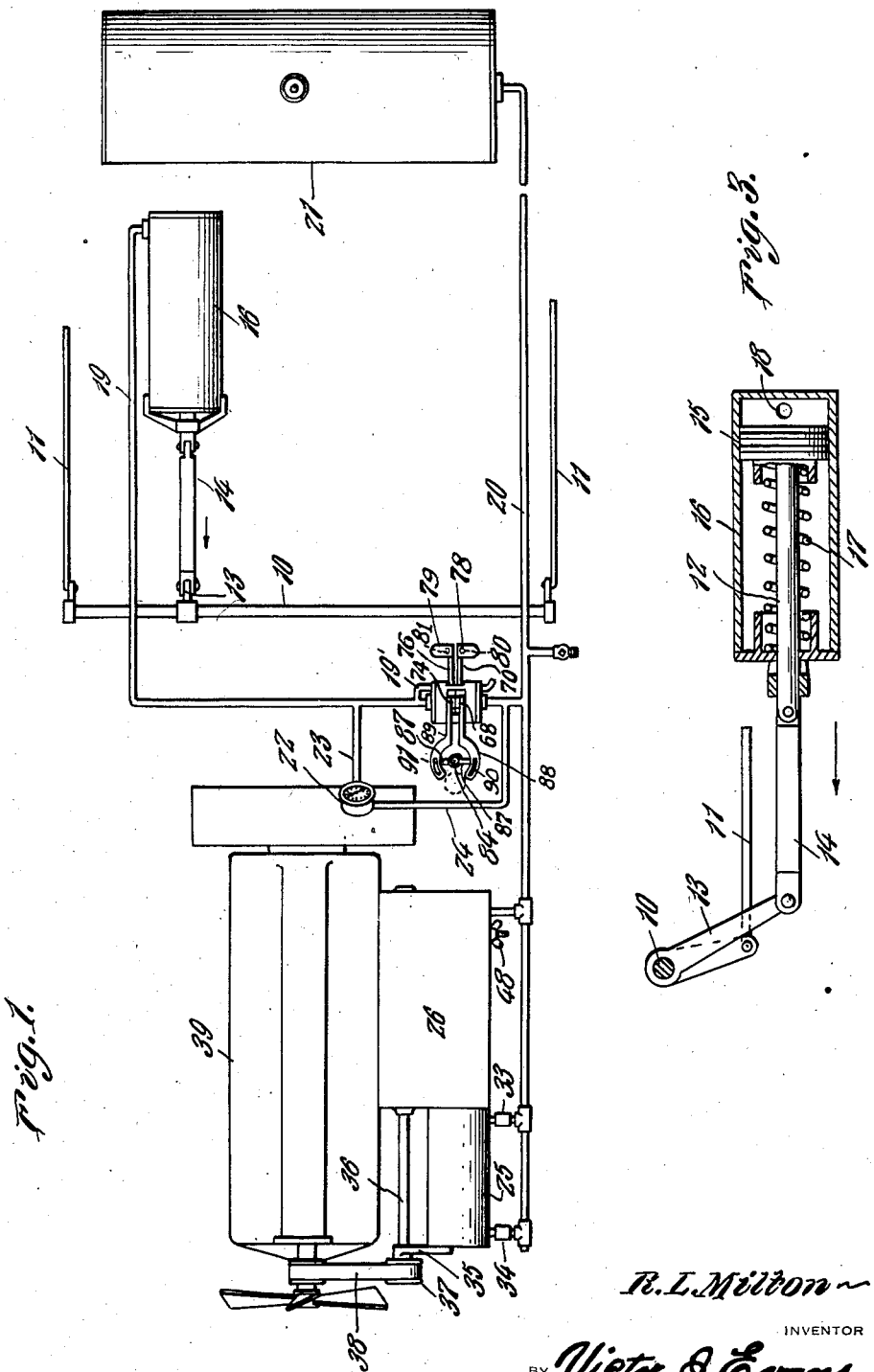
R. L. Milton
INVENTOR
BY Victor J. Evans
ATTORNEY

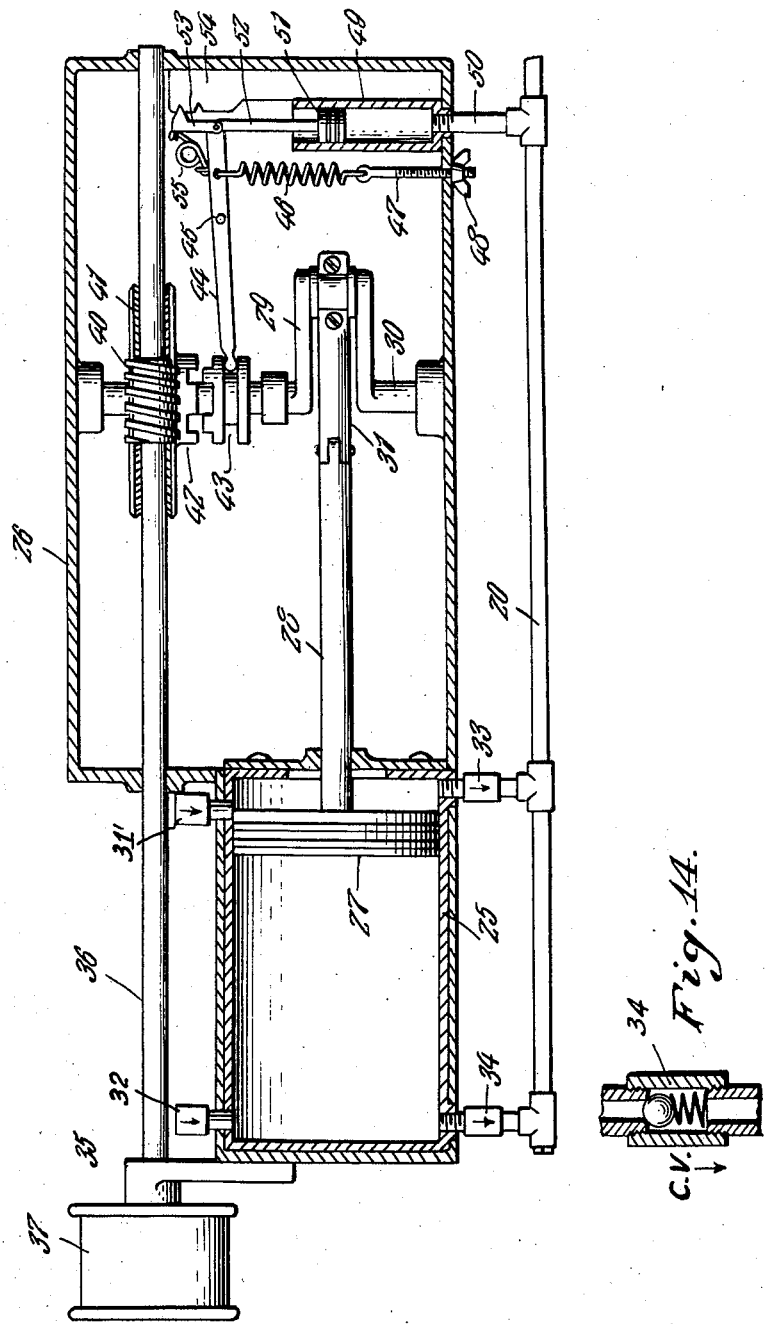

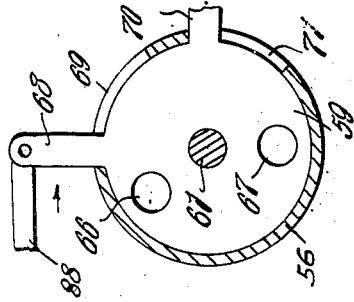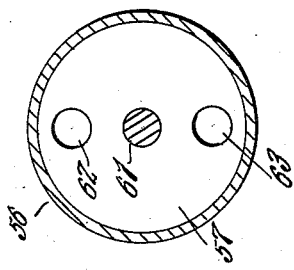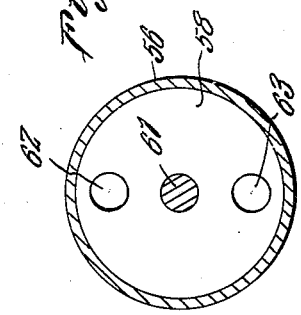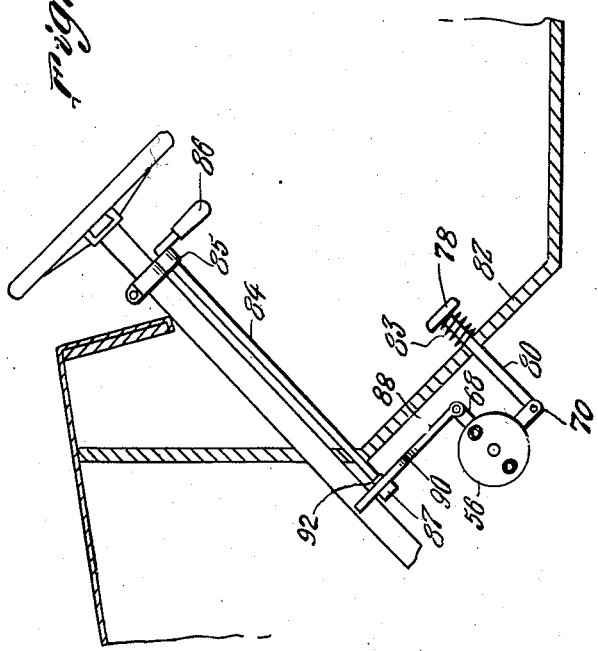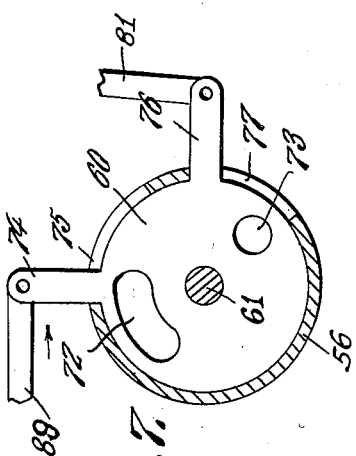

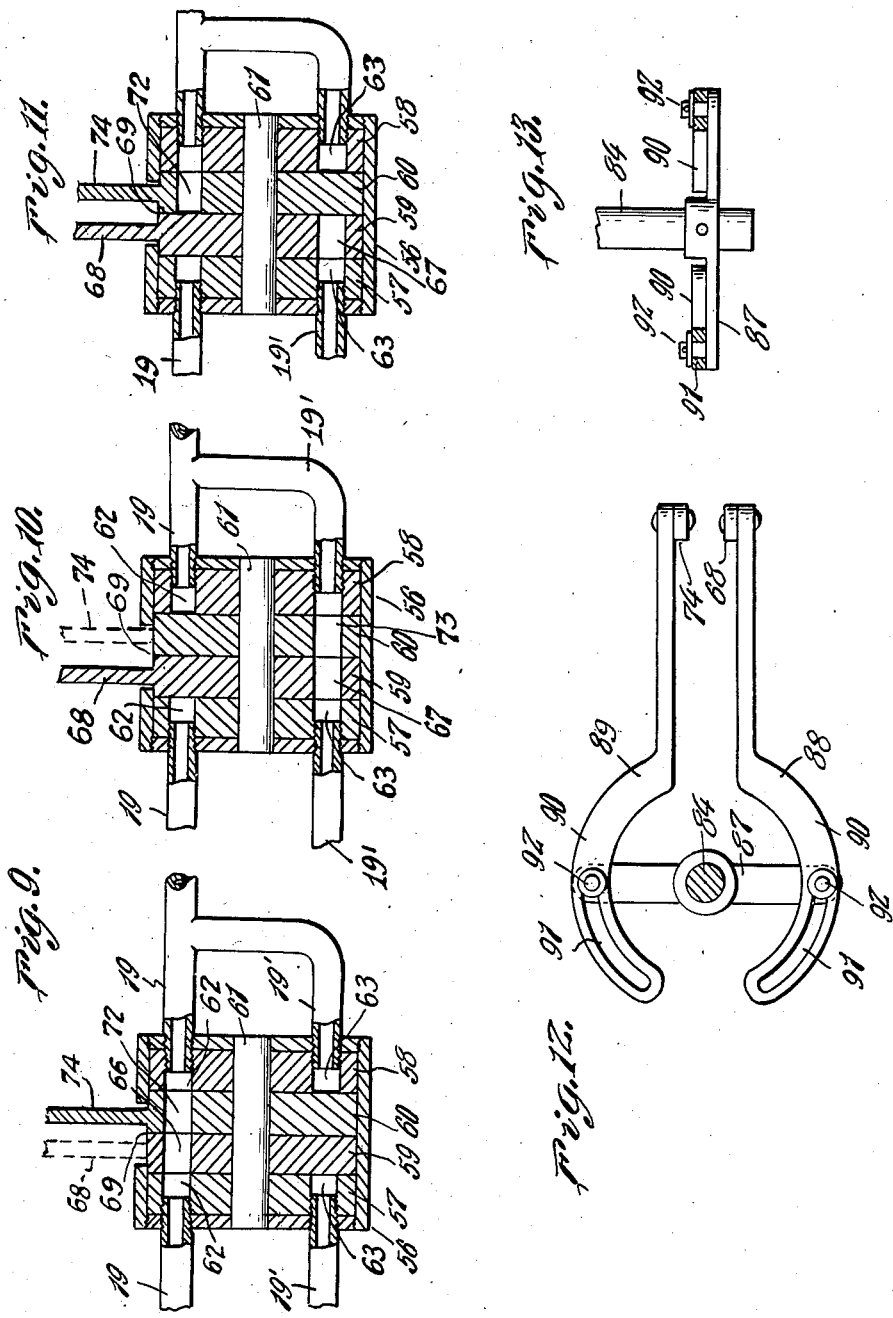

Patented Feb. 4, 1930

1,745,552

UNITED STATES PATENT OFFICE

ROBERT L. MILTON, OF ST. PAUL, MINNESOTA

VEHICLE BRAKE MECHANISM

Application filed October 27, 1926. Serial No. 144,598.

This invention aims to provide a novel construction of air operated brake mechanism for motor operated vehicles or the like, and contemplates a structure which can be conveniently manipulated either by the feet or hands of the driver in a manner to effectively and quickly bring the car to a stop without a sudden jerk.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a plan view of the invention showing a portion of the vehicle.

Figure 2 is a longitudinal sectional view through the pump and operating means therefor.

Figure 3 is a sectional view through the cylinder and piston for operating the brakes.

Figure 4 is a fragmentary sectional view of the vehicle showing the mounting of the valve, and the hand and foot controlled means therefor.

Figure 5 is a sectional view through the valve showing one of the valve disks.

Figure 6 is a similar view showing another of said disks.

Figure 7 is a similar view showing a third disk.

Figure 8 is a similar view showing the remaining disk.

Figure 9 is a sectional view through the valve showing the arrangement of the disks when the valve is operated to apply the brakes.

Figure 10 is a similar view showing the position of the disks when the valve is operated to effect a release of the brakes.

Figure 11 is a similar view showing the neutral position of the disks.

Figure 12 is a plan view of the hand operated levers for controlling the brakes by hand.

Figure 13 is a sectional view taken at a right angle to Figure 12.

Figure 14 is a fragmentary sectional view.

Referring to the drawings in detail 10 represents a shaft of a motor operated vehicle with which the usual brake rods 11 are connected and actuated to apply the brakes incident to the rotation of the shaft 10 in one direction as will be readily understood.

In accordance with the present invention this shaft 10 is controlled by an air actuated piston rod 12 which is connected with an arm 13 carried by the shaft 10 through the instrumentality of a pivoted link 14 as clearly shown in Figure 2. The piston rod is associated with a piston 15 which operates in a cylinder 16 and is normally held adjacent one end of the cylinder by a coil spring 17 as shown. This cylinder has an opening 18 adjacent one end with which the branch 19 of an air supply pipe 20 communicates, so that when air is admitted into the cylinder 16, it forces the piston 15 in one direction to rock the shaft 10 in a manner to apply the brakes as will be readily understood. The air for the cylinder 16 is taken from a storage tank 21 with which the supply pipe 20 communicates, this pipe being utilized to both supply the storage tank with air, and also to convey the air to the cylinder 16 for the purpose above mentioned. Mounted upon the dash board or in any other suitable position on the vehicle is a pressure gauge 22 by means of which the pressure of air in the tank 21 may be readily determined, this gauge being arranged in the air line by means of the pipe sections 23 and 24 respectively.

For the purpose of supplying the storage tank 21 with air I make use of a pump including a cylinder 25 which is supported at one end of a casing 26 in which the operating mechanism for the pump is located. Operating in the cylinder 25 is a piston 27 including a piston rod 28 which is connected with the crank portion 29 of a shaft 30 by means of an arm 31 suitably journaled on the shaft as shown in Figure 2. The cylinder 25 is provided with air inlet ports 31' and 32 respectively, located adjacent the ends of the cylinder, so that air is drawn into the cylinder during the reciprocatory motion of the piston 27. Also communicating with the cylinder 25 adjacent the opposed ends thereof are valve controlled outlet pipes 33 and 34 respectively which communicate with the supply pipe 20 above mentioned. Consequently when the piston is moved in one direction air is forced from the cylinder through one of the valve control pipes into the supply pipe 20, while air is drawn in at the other end of the cylinder, to be subsequently forced out upon reverse motion of the piston, and in this manner the storage tank 21 is supplied with air. Journaled in the casing 26, and also in a bearing 35 supported at one end of the cylinder 25 is a shaft 36 which carries a belt pulley 37, and over which is trained a fan belt 38 of the motor 39, so that the shaft 36 is rotated from the motor. This shaft carries a worm gear 40 which meshes with a spiral gear 41 loosely mounted upon the shaft 30, and which gear has associated therewith one part 42 of a clutch. Keyed and slidably mounted upon the shaft 30 is the cooperating part 43 of this clutch which is moved into and out of engagement with the part 42 by means of a lever 44 pivoted as at 45. A spring 46 is connected with the lever 44 and also with a threaded bolt 47 projecting through an opening in the wall of the casing 26 and having associated therewith a wing nut 48, by means of which the tension of the spring 46 can be varied to control the desired pressure of air in the storage tank 21. Arranged adjacent this spring 46 is a cylinder 49 which receives air from the supply pipe 20 through a branch 50, while operating within the cylinder is a piston 51 from which projects a piston rod 52 connected with the lever 44. This piston cooperates with the spring 46 for controlling the movements of the clutch member 43. In order to hold the parts in a given position I employ a pivoted pawl 53 carried by the lever and adapted to cooperate with a notched bar 54, a spring 55 holding the pawl engaged with said bar. The pivoted pawl 53 is released through the operation of the clutch member 43.

Now, the sliding clutch member 43 is normally spaced from the clutch member 42, so that the motor may operate without operating the pump arranged at the forward end of the casing 26 until it is necessary to do so. In other words when the pressure in the tank 21 is diminished beyond a predetermined degree, the piston 51 moves inwardly in the cylinder 49, thereby allowing the spring 46 to move the lever 44 in a direction to throw the clutch member 43 into engagement with the cooperating member 42, whereupon the shaft 30 is rotated to operate the pump for the purpose above mentioned. When the pressure in the tank is increased to a predetermined degree, the pressure in the cylinder 49 is sufficient to move the piston 51 in an opposite direction, and overcome the tension of the spring 46 for the purpose of disengaging the clutch members. The pump then ceases to operate.

In order to control the brakes, the air from the supply pipe passes through a valve before reaching the cylinder 16, and as shown in Figure 4 this valve is preferably arranged directly beneath the floor board, and is constructed to be operated by either the feet or hands of the driver. The valve itself is better illustrated in Figures 5 to 11 inclusive, and consists of a casing 56 in which is arranged two outermost stationary disks 57 and 58 respectively, and two intermediate disks 59 and 60 respectively which are independently movable for a purpose to be hereinafter described. All of these disks are provided with central openings to accommodate a shaft 61 which is supported by the end walls of the casing 56 and utilized to hold the disks associated. As shown in Figures 5 and 8, each of the outermost disks 57 and 58 are provided with spaced openings 62 and 63 respectively which are always arranged in alignment, communicating with the pipes 19 and 19' at the opposite ends of the casing as shown. The disk 59 however is provided with spaced openings 66 and 67 respectively which are arranged in the manner shown in Figure 6, while this disk is also provided with an arm 68 arranged to operate in a slot 69 in the casing and an additional arm 70 arranged to operate in a slot 71 in the casing. As shown in Figure 7 the adjacent disk 60 is provided with an arcuate-shaped slot 72 and an opening 73, while this disk is also provided with an arm 74 arranged to operate in a slot 75 in the casing and an additional arm 76 arranged to operate in a slot 77 in the casing.

Now, upon inspection of Figure 11 the disks 59 and 60 respectively are arranged with their respective openings out of alignment, this constituting the neutral position of the valve, although it will be noted that the opening or slot 72 of the disk 60 is in alignment with the openings 62 of the disks 57 and 58. When it is desired to apply the brakes the disk 59 is rotated to bring the opening 66 thereof in alignment with the adjacent openings of the other disks as shown in Figure 9, whereupon air passes through the pipe 19 to the cylinder 16 to operate the piston 15 in a manner and for the purpose above described. When it is desired to release the brake, the disk 60 is rotated to bring the opening 73 into alignment with the openings 63 of the end disks, and also in alignment with the opening 67 of the disk 59 as shown in Figure 10, whereupon the air is allowed to escape from the cylinder 16 through the pipe 19 and into a branch 19' which opens at both sides of the casing to allow the air to escape to the atmosphere.

For controlling the disks 59 and 60 by the feet I provide pedals 78 and 79 respectively, the shank 80 of the former being connected with the arm 70 of the disk 59, while the shank 81 of the other pedal is connected with the arm 76 of the disk 60. These shanks slide through the floor board 82 and are surrounded by coil springs 83 which normally hold the pedals elevated and the said disks in neutral positions. Consequently when it is desired to apply the brakes, by admitting air to the cylinder 16, the pedal 78 is slightly depressed, to operate the disk 59 in the manner described, whereupon the disks are arranged in the manner shown in Figure 9. When it is desired to release the brakes by allowing the air to escape from the cylinder 16, and thus allowing the spring 17 to force the piston 15 to its normal position, the pedal 79 is depressed to operate the disk 60, whereupon the disks assume the positions shown in Figure 10.

For the purpose of operating the valve by hand I make use of a rod 84 which is arranged parallel with the steering post and journaled in a suitable bracket 85, the rod being provided with a handle 86 arranged immediately beneath the steering wheel within convenient reach of the operator. This rod is passed through a transverse bar 87 to which it is secured at a point beneath the floor board of the vehicle as shown in Figure 4, the bar 87 being associated with the levers 88 and 89 respectively, the latter being in turn connected with the arms 68 and 74 respectively of the disks 59 and 60. These levers 88 and 89 are used singly to operate their respective disks in the same manner as the foot pedals 78 and 79 are used. In other words each of the levers 88 and 89 is provided with a curved portion 90 having an arcuate-shaped slot 91, while carried by the ends of the bar 87 are pins 92 which operate in the slots 91. As shown in Figure 12, when the rod 84 is turned in one direction, the lever 88 is actuated to operate the disk 59 in the same manner as if the foot pedal 78 had been depressed, and during this operation of the lever 88, the lever 89 remains inactive as the pin 92 idles through the slot 91 of the latter mentioned lever. In this instance the disk 59 is arranged in the position shown in Figure 9 to apply the brakes in the manner above described, and when it is desired to release the brakes the movement of the rod 84 is reversed to call into use the lever 89, which of course being connected with the disk 60 operates the latter in the same manner as if the pedal 79 was depressed, to arrange the disk 60 in the manner shown in Figure 10. It is manifest that by reason of the construction herein shown and described, that the brakes of the vehicle can be easily manipulated by one legged or one armed persons, and the brakes effectively applied to bring the car to a stop with an equal distribution of the braking effect on both of the drive wheels. It also eliminates the use of an emergency brake lever, which is not always thought of in an emergency, and frequently inconvenient to manipulate under such conditions.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. In a fluid pressure brake system, a control valve including a casing, spaced stationary disks arranged within the casing, a pair of intermediate disks independently movable, all of said disks having passages adapted to be selectively aligned, hand actuated means for controlling said intermediate disks, and foot operated means for controlling said disks independently of the hand operated means.

2. In a fluid pressure brake system, a control valve including a casing having slots therein, spaced stationary disks, a pair of intermediate disks independently rotatable between the stationary disks, all of said disks having passages adapted to be selectively aligned, an arm projecting from each of the intermediate disks, and operating through said slots of the casing, foot actuated means connected with said arms for operating said disks, an additional arm projecting from each intermediate disk, and hand actuated means connected with the last mentioned arms for operating said disks independently of the foot actuated means.

In testimony whereof I affix my signature.

ROBERT L. MILTON.